United States Patent [19]
De Doncker et al.

[11] Patent Number: 5,373,195
[45] Date of Patent: Dec. 13, 1994

[54] TECHNIQUE FOR DECOUPLING THE ENERGY STORAGE SYSTEM VOLTAGE FROM THE DC LINK VOLTAGE IN AC ELECTRIC DRIVE SYSTEMS

[75] Inventors: Rik W. A. A. De Doncker; Robert D. King, both of Schenectady, N.Y.

[73] Assignee: General Electric Company, Schenectady, N.Y.

[21] Appl. No.: 993,879

[22] Filed: Dec. 23, 1992

[51] Int. Cl.$^5$ ............................................. H02M 5/458
[52] U.S. Cl. .................................... 307/45; 307/46; 307/72; 363/98; 323/222; 323/271
[58] Field of Search ............... 318/139, 150, 161, 254; 323/207, 222, 271; 307/45, 46, 72; 363/35, 37, 51, 56, 58, 96, 97, 98

[56] References Cited

U.S. PATENT DOCUMENTS

| | | | |
|---|---|---|---|
| 4,666,020 | 5/1987 | Watanabe | 187/114 |
| 4,672,520 | 6/1987 | Ueda et al. | 363/37 |
| 4,787,021 | 11/1988 | Hokari et al. | 363/37 |
| 5,214,358 | 5/1993 | Marshall | 318/139 |

*Primary Examiner*—A. D. Pellinen
*Assistant Examiner*—Aditya Krishnan
*Attorney, Agent, or Firm*—Jill M. Breedlove; Marvin Snyder

[57] ABSTRACT

An ac electric drive system includes a bidirectional power semiconductor interface between a battery, or an auxiliary energy storage device, and a power inverter for boosting an input dc voltage and for decoupling the dc link voltage from the input dc voltage such that the dc link voltage is substantially independent of the input dc voltage and the parameters of the battery or energy storage device. The input dc voltage is controlled to maximize efficiency along predetermined torque envelopes.

11 Claims, 6 Drawing Sheets

TECHNIQUE FOR DECOUPLING THE ENERGY STORAGE SYSTEM VOLTAGE FROM THE DC LINK VOLTAGE IN AC ELECTRIC DRIVE SYSTEMS

FIELD OF THE INVENTION

The present invention relates generally to electric drive systems. More particularly, the present invention relates to a power semiconductor interface that allows the voltage of a propulsion battery, or that of an auxiliary energy storage device, to be decoupled from the dc link voltage of an ac electric drive system, thereby improving reliability and efficiency.

BACKGROUND OF THE INVENTION

Today's electric vehicle drives require increasing levels of torque and power to meet aggressive vehicle acceleration and grade-climbing requirements. To be practical, commercial electric vehicle drives require minimized cost, size, and weight. During the last decade, as higher voltage semiconductor devices have become available, industry has increased drive system power density by increasing the system voltage (i.e., dc link voltage) from approximately 100 V to 300 V, thereby allowing higher voltage-rated, but lower current-rated, power semiconductors to be used in the inverter. This trade-off advantageously minimizes the size and cost of electric drive systems. Except for the battery, the inverter is the most expensive subsystem in the total electric drive system, and the power semiconductor switches are generally the most expensive components in the inverter. For typical voltage levels of these drives, power semiconductor cost increases more rapidly as a function of current rather than voltage.

Increasing the dc system voltage has resulted in significant performance improvements while reducing costs. However, increasing the dc system voltage also requires the battery to be designed for relatively high voltage (typically 300 V nominal), which is accomplished by both designing lower current capacity cells and connecting larger numbers of small cells (e.g., 2 V) in series, disadvantageously reducing battery reliability and life due to cell-to-cell capacity mismatch. The larger number of cells that are connected in series, the greater the probability of cell-to-cell variations. Battery weight constraints also limit the number of series strings of cells that can be connected in parallel, further reducing reliability.

Accordingly, it is desirable to provide a solution to the high-voltage battery reliability problem and to increase efficiency in ac electric drive systems by decoupling the energy storage system from the dc link voltage.

SUMMARY OF THE INVENTION

An ac electric drive system includes: a power inverter for converting a dc link voltage to an ac output voltage; means for coupling an energy storage device to the power inverter for delivering an input dc voltage to the drive system; and a bidirectional power semiconductor interface comprising a dc-to-dc converter coupled between the means for coupling and the inverter. The dc-to-dc converter boosts the input dc voltage by a predetermined factor and decouples the dc link voltage from the input dc voltage such that the dc link voltage is substantially independent of the input dc voltage and the parameters of the energy storage device. Control means are provided for controlling the input dc voltage in order to control operation of the electric drive system to maximize efficiency along a predetermined torque envelope.

Advantageously, by using a power semiconductor interface of the present invention, the battery or energy storage device of an electric drive system may be designed at a voltage that maximizes its reliability and life, while the voltage input to the drive system is controlled through the interface to maximize efficiency and minimize stress on the inverter components for given torque/speed operating points.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
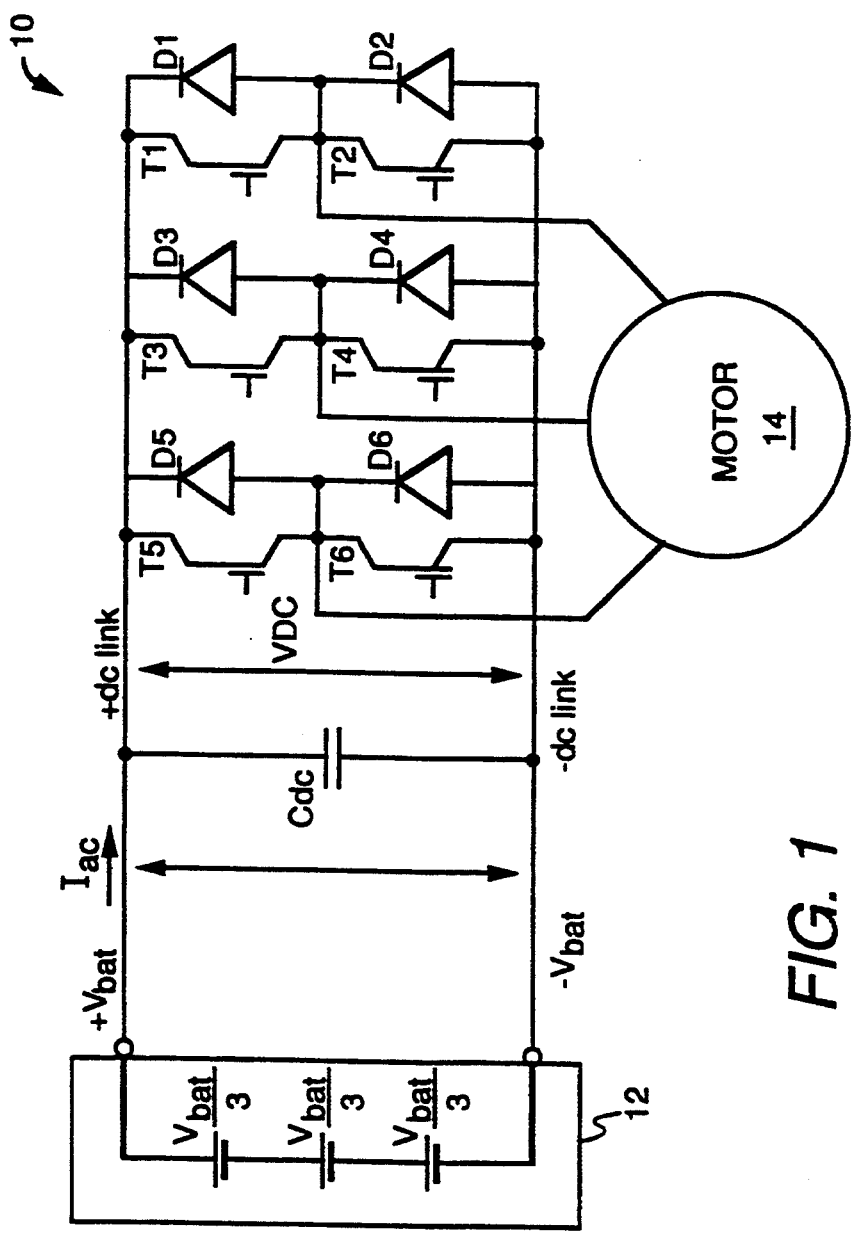
FIG. 1 schematically illustrates a conventional electric drive having an inverter directly coupled to a battery.

FIG. 1 illustrates a conventional electric drive system including an inverter 10 directly coupled to a battery 12 for driving a motor 14. Motor 14 may comprise any suitable type of ac machine, including, for example, an induction machine, a permanent magnet synchronous machine (interior or surface magnet), an electronically commutated motor, or a switched reluctance machine. An input filter capacitor $C_{dc}$ is coupled across the dc link $V_{dc}$. Inverter 10 is shown as comprising a three-phase inverter having two series-connected switching devices per phase leg $T_1$–$T_2$, $T_3$–$T_4$, and $T_5$–$T$, respectively. A diode $D_1$–$D_6$ is coupled in antiparallel with each switching device $T_1$–$T_6$, respectively.

In conventional manner, switching devices $T_1$–$T_6$ are controlled via a microprocessor-based inverter/motor control (not shown) in response to an external torque command. The instantaneous value of the dc link voltage $V_{dc}$ is a function of battery parameters (e.g., open circuit voltage, internal resistance, state of charge, temperature) as well as motor characteristics and the magnitude and polarity of the torque command to the electric drive systems. Low speed, light torque operation requires that the inverter operate in a pulse width modulation (PWM) mode to chop the relatively high battery voltage $V_{bat}$ down to the level required for proper operation of the motor, resulting in substantial switching losses in the inverter switching devices.

Battery 12 is shown schematically in FIG. 1 as a relatively high voltage battery configured as a series connection of three battery modules, each with a voltage of $V_{bat}/3$. Disadvantageously, in a conventional electric drive system such as that of FIG. 1, significant degradation of battery capacity results when a failure occurs in one or more of the parallel strings of cells that make up a single module of the high voltage battery.

However, in accordance with the present invention, energy from a battery or auxiliary energy storage device is efficiently transferred through a power semiconductor interface circuit to a high voltage ac drive. Exemplary auxiliary energy storage devices include ultracapacitors or magnetic energy storage devices, such as superconducting magnetic energy storage devices (SMES). The interface circuit decouples the energy storage device voltage from the dc link voltage of the drive system, thereby maximizing utilization of the energy storage device. Furthermore, the interface circuit provides bidirectional rapid energy conversion, allowing for rapid drive acceleration and recovery of regenerative energy.

Figure 2:
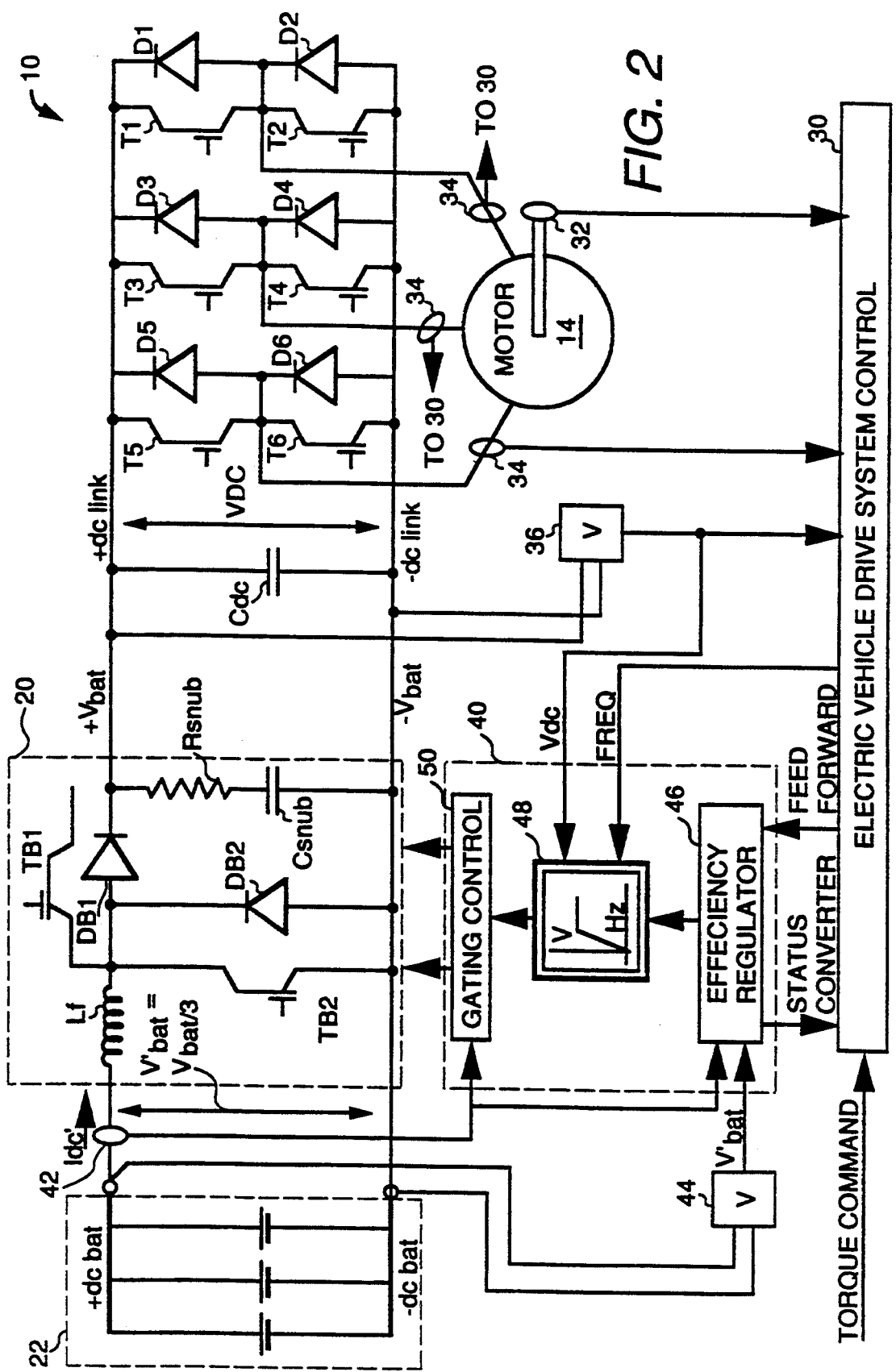
FIG. 2 schematically illustrates an ac electric drive including an interface circuit according to one embodiment of the present invention.

FIG. 2 illustrates an electric ac drive system according to one embodiment of the present invention. An interface circuit 20, comprising a dc-to-dc converter, is coupled between a battery 22 and inverter 10. Advantageously, by virtue of interface circuit 20, battery 22 comprises a lower voltage battery ($V_{bat}$) than battery 12 ($V_{bat}$) of FIG. 1. Specifically, battery 22 is shown in FIG. 2 as comprising three battery modules connected in parallel, rather than in series, reducing the overall battery voltage by a factor of three as compared with that of FIG. 1.

To achieve high power and high speed with the drive system of FIG. 2, the lower battery voltage $V_{bat}'$ must be boosted by, at most, a factor of three. Moreover, the total battery current $I_{dc}'$ must be three times that of the dc link current $I_{dc}$ of FIG. 1. Therefore, the current rating of the switching devices of dc-to-dc converter 20 of FIG. 2 is required to be approximately three times the current rating of the phase leg switches for the conventional system of FIG. 1.

FIG. 2 illustrates dc-to-dc converter 20 as comprising a buck-boost (i.e., bidirectional) converter of well-known type having an input filter inductor $L_f$ coupled in series with the parallel combination of a first switching device $T_{b1}$ and an antiparallel diode $D_{b1}$. The parallel combination of a second switching device $T_{b2}$ and an antiparallel diode $D_{b2}$ is coupled between the negative dc link voltage $-V_{dc}$ and the junction joining filter inductor $L_f$ and switching device $T_{b1}$. The series combination of a snubber resistor $R_{snub}$ and a snubber capacitor $C_{snub}$ is coupled between the negative dc link voltage $-V_{dc}$ and the cathode of diode $D_{b1}$.

An electric vehicle drive system control 30 receives: an external torque command (such as mentioned hereinabove with reference to FIG. 1); motor speed measurements from a tachometer 32; phase current measurements from current sensors 34; and dc link voltage measurements from a voltage sensor 36. In addition, control 30 receives a signal indicative of the status of dc-to-dc converter 20, as described hereinbelow, from a dc-to-dc controller 40. In turn, control 30 converts the motor speed signals from tachometer 32 to frequency signals FREQ to dc-to-dc controller 40 and further provides feed forward signals for generating gating signals to the switching devices of dc-to-dc converter 20 and inverter 10.

As also shown in FIG. 2, dc-to-dc controller 40 receives battery voltage measurements $V_{bat}'$ from a voltage sensor 42 and dc input current $I_{dc}'$ measurements from a current sensor 44. More specifically, the voltage $V_{bat}'$ and current $I_{dc}'$ measurements are provided to an efficiency regulator 46 which provides an efficiency regulating signal to a voltage control block 48 for maximizing efficiency along a predetermined torque envelope. Voltage control block 48 uses the dc link voltage measurements from voltage sensor 44 and frequency signals FREQ from control 30 for controlling the input dc voltage $V_{bat}'$ in order to maximize efficiency and control motor operation along the predetermined torque envelope. The appropriate gating signals for controlling operation along this torque envelope are generated via gating control block 50.

Figure 3:
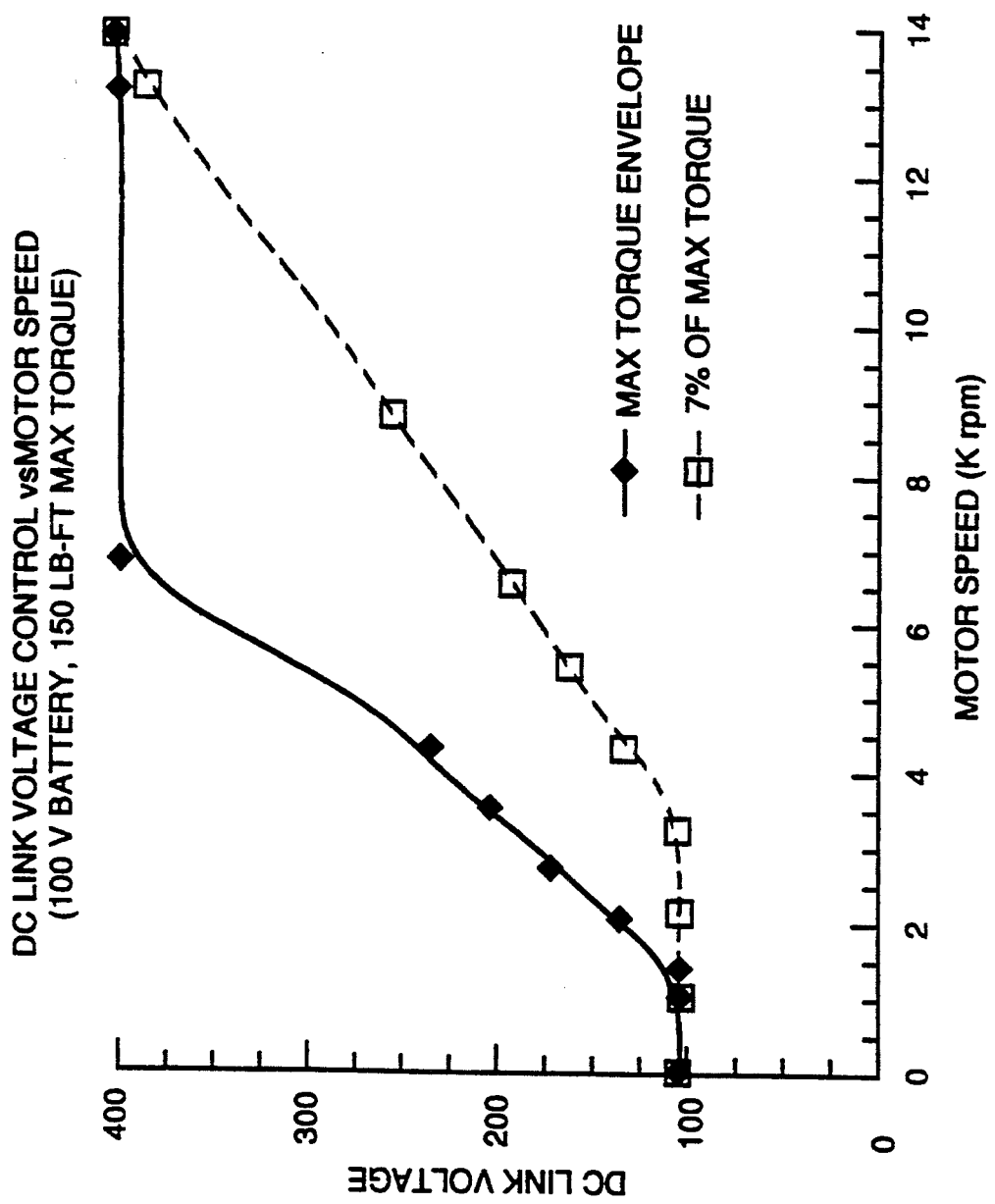
FIG. 3 graphically illustrates dc link voltage versus motor speed and resulting exemplary torque envelopes for control of an ac electric drive in accordance with the present invention.

FIG. 3 illustrates dc link voltage versus motor speed data and the resulting torque envelopes for an electric vehicle drive system such as that employed by voltage control block 48. In accordance with the present invention, dc-to-dc controller 40 controls operation along a predetermined torque envelope, such as illustrated in FIG. 3, for maximum efficiency. Data such as that of FIG. 3 may, for example, be stored by dc-to-dc controller 40 (FIG. 2) as a look-up table.

In operation, during driving (or motoring), dc-to-dc converter 20 boosts the lower battery voltage $V_{bat}'$ to the higher dc link voltage $V_{dc}$. At low speed and light torque, switches Tb1 and Tb2 are off, such that the status of converter 20 is OFF, and the battery voltage $V_{bat}'$ is coupled to inverter 10 via forward-biased diode $D_{b1}$. For increasing speed and torque, switching devices $T_{b1}$ and $T_{b2}$ of interface 20 are used to boost the battery voltage. In particular, the status of converter 20 is ON, and operation is maintained along the predetermined torque envelope as follows. When switch $T_{b2}$ is turned on, current increases in inductor $L_f$. After the current increases to a controlled level, switch $T_{b2}$ is turned off, and the derivative of the current flowing in inductor $L_f$ changes sign, inducing a voltage across inductor $L_f$. Diode $D_{b1}$ becomes forward-biased, increasing the dc link voltage and supplying power to the motor. When the inductor current decreases to a controlled value, switch $T_{b2}$ is again switched on, and the cycle repeats.

On the other hand, during regenerative braking, electric power from the high voltage dc link is converted to the battery voltage value $V_{bat}'$, resulting in current flow into the battery. In particular, during regenerative braking, switch $T_{b2}$ is held off. Switch $T_{b1}$ is turned on, causing current to increase in inductor $L_f$. After the current increases to a controlled level, switch $T_{b1}$ is turned off, and the derivative of the current in inductor $L_f$ changes sign, inducing a voltage thereacross. Current flows in a complete circuit from the inductor $L_f$, into the battery, and back to the inductor $L_f$ through the forward-biased diode $D_{b2}$. During the time when switch $T_{b1}$ is off, the dc link current charges filter capacitor $C_{dc}$. Advantageously, high-frequency chopping is utilized in the regenerative braking mode, enabling reduction in the size and weight of the passive components in dc-to-dc converter 20 and inverter 10. Additionally, depending on battery regenerative current limits, switch $T_{b1}$ could have a lower current rating than that of switch $T_{b2}$.

The electric drive system of FIG. 2 exhibits improved efficiency during operation at light torque and speeds below the motor corner point speed. At high torque and high speed, however, system efficiency of the total ac drive, including dc-to-dc converter 20, is expected to be slightly less than in the original drive shown in FIG. 1. However, for most battery powered electric vehicle applications, a very small portion of total driving is performed on the maximum power or torque envelope. Therefore, a reduction in system efficiency on the maximum torque envelope is a reasonable trade-off to achieve improved reliability and fault tolerance of the battery or energy storage device.

As an additional advantage of the power semiconductor interface circuit of the present invention, reduced ac current ripple is applied to the battery due to the presence of series inductor $L_f$.

Figure 4:
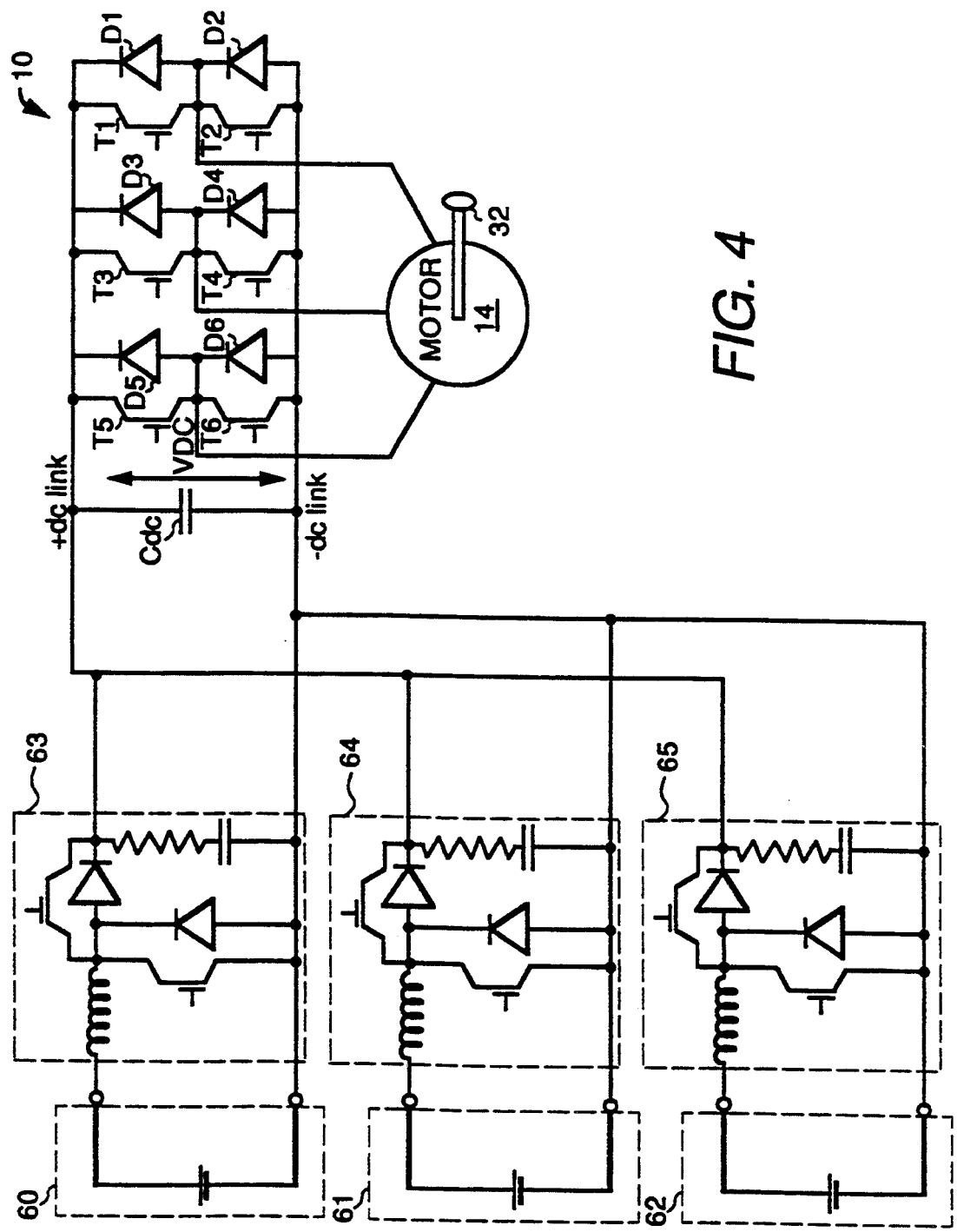
FIG. 4 schematically illustrates an ac electric drive according to an alternative embodiment of the present invention.

FIG. 4 illustrates an alternative embodiment of an electric drive system according to the present invention wherein a plurality n of batteries is employed, each having a dc-to-dc converter interface between the battery and inverter 10. The converter switching devices each have 1/n the current rating of those of the dc-to-dc converter of FIG. 2, or approximately the same current rating as the switching devices of the conventional system of FIG. 1. For example, the system of FIG. 4 is shown as having three batteries 60–62 and three corresponding dc-to-dc converter interfaces 63–65, respectively. Advantageously, the system of FIG. 4 yields additional fault tolerance during individual battery hard-failure or soft-failure. When a hard failure (e.g., a short or open circuit) is detected, the respective dc-to-dc converter is disabled, and the drive operates at ⅔ capacity. During a soft failure (i.e., battery degradation), external control could be employed to reduce the load on the degraded battery to maintain the same voltage as the other two batteries, thereby supplying the highest power level to the motor without producing additional stress on the battery having reduced capacity.

Figure 5:
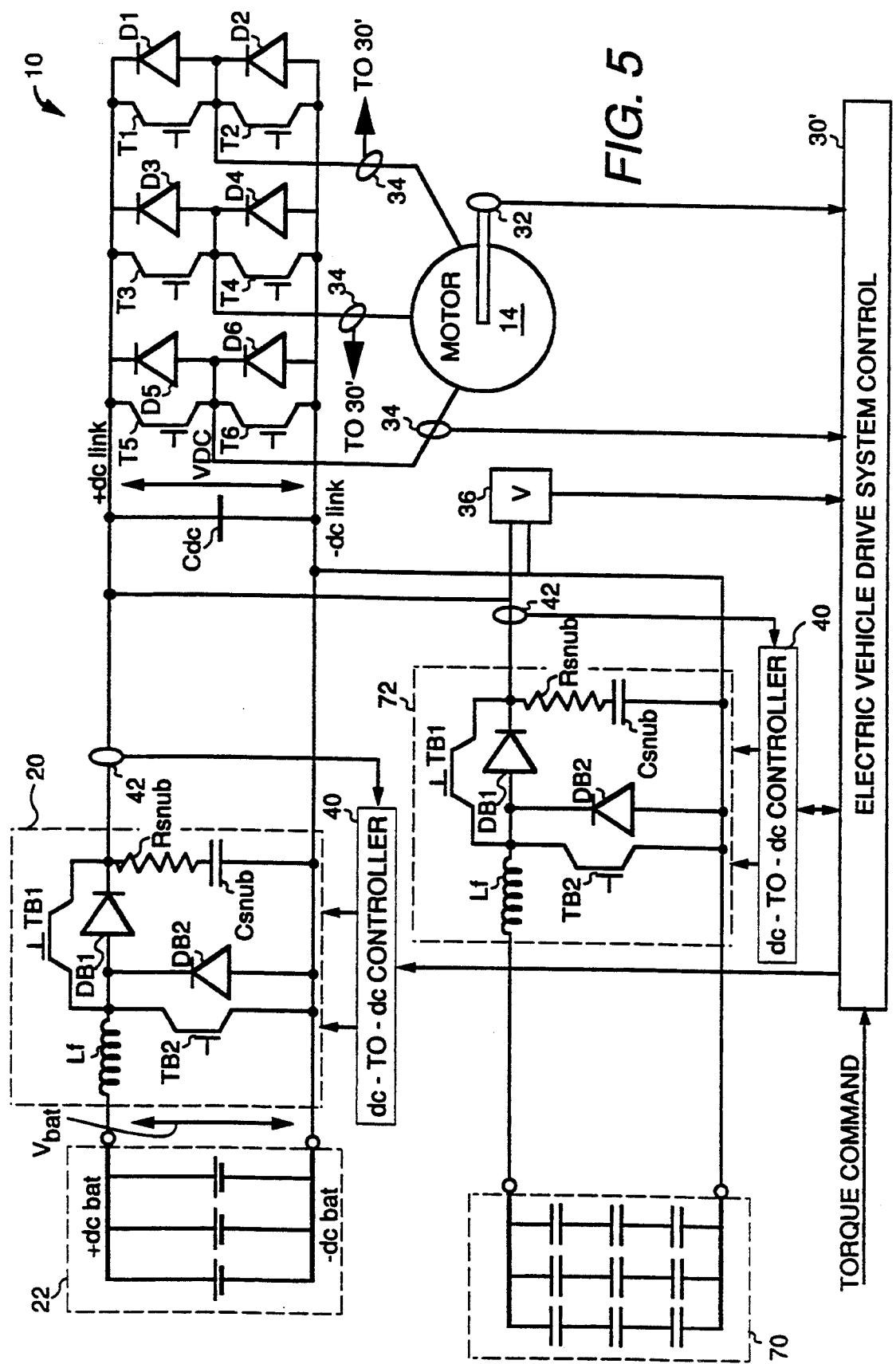
FIG. 5 schematically illustrates an ac electric drive according to another alternative embodiment of the present invention.

FIG. 5 illustrates another alternative embodiment of the electric drive system of the present invention using both a low-voltage propulsion battery 22 and an auxiliary energy storage device 70. Energy storage device 70 is shown as comprising an ultracapacitor bank. Battery 20 and ultracapacitor bank 70 are coupled to inverter 10 via a separate dc-to-dc converter interface 20 and 72, respectively. Each dc-to-dc converter interface has its own local control 40 with current feedback, gate drive and protection functions. Propulsion source sequencing (i.e., proportioning the instantaneous power between the battery and ultracapacitor bank in response to the torque command), is provided by control 30'. Since dc-to-dc converters 20 and 72 are both bidirectional, system control allows the ultracapacitors to be charged either by regenerative braking or from the propulsion battery. In particular, the ultracapacitor bank dynamically delivers or accepts high power during vehicle accelerations and regenerative braking, thereby reducing the propulsion battery peak power to a level somewhat over the average power of the drive. Hence, although the system of FIG. 5 uses two additional switching devices as compared with the system of FIG. 2, lower current-rated switching devices may be used, since dc-to-dc converter interface 20 is switching average power rather than peak power.

Figure 6:
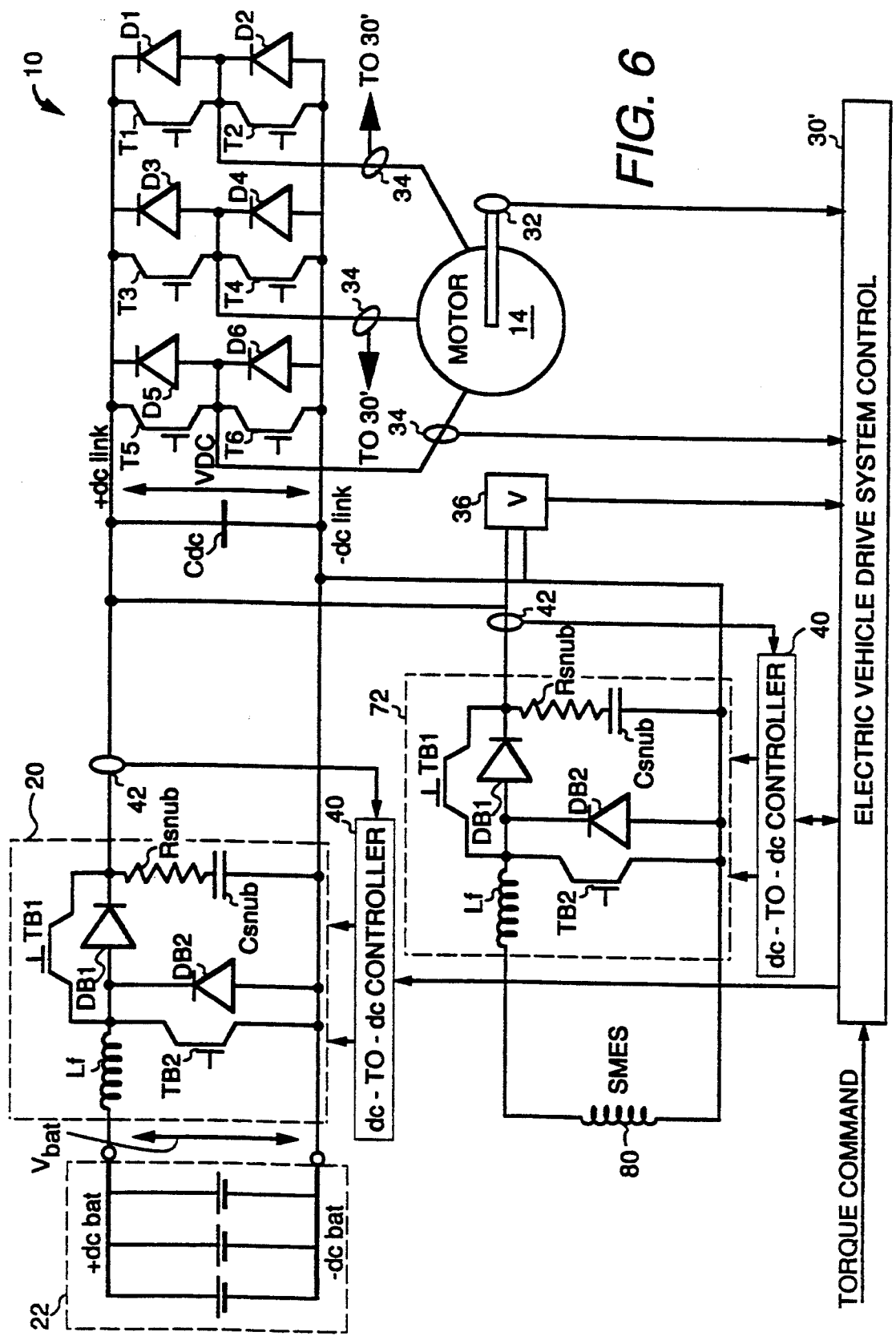
FIG. 6 schematically illustrates an ac electric drive according to yet another alternative embodiment of the present invention.

FIG. 6 illustrates yet another alternative embodiment of the present invention wherein a superconducting magnetic energy storage device (SMES) 80 is employed instead of ultracapacitor bank 70 of FIG. 5.

Advantages of the electric drive system of the present invention may be summarized as including the following:

1) Use of lower voltage battery modules with fewer cells connected in series, improving battery reliability and extending battery life;

2) Improved drive system fault tolerance during battery hard and soft failures;

3) Reduced ac current ripple applied to the battery due to the series inductor in the dc-to-dc converter interface circuit;

4) Improved system performance and control during operation with a battery having internal cells with unequal capacity;

5) Allows system configurations with multiple batteries and/or ultracapacitor energy storage devices, each operating over their respective voltage range and having one or more dc-to-dc converter interface circuits connected to a single dc bus of a high voltage ac drive inverter;

6) Reduced stress on inverter's switching devices, due to additional control capability that allows soft-switching operation during a significant portion of the time;

7) Improved drive system efficiency at low speeds and light torque operation due to reduced inverter switching losses;

8) For all types of ac machines, a wider speed range due to higher dc bus voltage.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. An electric drive system, comprising:
a power inverter for converting a dc link voltage to an ac output voltage;
means for coupling an energy storage device to said power inverter for delivering an input dc voltage to said drive system;
a bidirectional dc-to-dc converter coupled between said means for coupling and said inverter, said dc-to-dc converter boosting said input dc voltage by a predetermined factor, said dc-to-dc converter decoupling the dc link voltage from the input dc voltage delivered by said energy storage device such that the dc link voltage is substantially independent of the input dc voltage and parameters of the energy storage device; and
control means for controlling the input dc voltage by controlling operation of said electric drive system to maximize efficiency along predetermined torque envelopes.

2. The electric drive system of claim 1 wherein said energy storage device comprises a battery having parallel-connected modules.

3. The electric drive system of claim 1 wherein said dc-to-dc converter comprises a buck-boost converter.

4. The electric drive system of claim 1 wherein said control means employs dc link voltage versus motor speed data and the resulting predetermined torque envelopes stored in memory as a look-up table.

5. An electric drive system, comprising:

a power inverter for converting a dc link voltage to an ac output voltage;

means for coupling each of a plurality of energy storage devices to said power inverter for delivering an input dc voltage to said drive system;

a bidirectional dc-to-dc converter coupled between each said means for coupling and said inverter, each said dc-to-dc converter boosting the input dc voltage of the respective energy storage device by a predetermined factor, each said dc-to-dc converter decoupling the dc link voltage from the input dc voltage delivered by the respective energy storage device such that the dc link voltage is substantially independent of the respective input dc voltage and parameters of the respective energy storage device; and control means for controlling the input dc voltage supplied by each said energy storage device by controlling operation of said electric drive system to maximize efficiency along predetermined torque envelopes.

6. The electric drive system of claim 5 wherein at least one of said energy storage devices comprises a battery.

7. The electric drive system of claim 5 wherein at least one of said energy storage devices comprises a ultracapacitor.

8. The electric drive system of claim 5 wherein at least one of said energy storage devices comprises a superconducting magnetic energy storage device.

9. The electric drive system of claim 5 wherein said control means comprises a controller associated with each respective dc-to-dc converter.

10. The electric drive system of claim 5 wherein each said dc-to-dc converter comprises a buck-boost converter.

11. The electric drive system of claim 5 wherein said control means employs dc link voltage versus motor speed data and the resulting predetermined torque envelopes stored in memory as a look-up table.

* * * * *